United States Patent
Nishimura et al.

[11] Patent Number: 5,772,101
[45] Date of Patent: Jun. 30, 1998

[54] WAVE SOLDERING MACHINE

[75] Inventors: Tetsuro Nishimura, Osaka; Yasuo Seo, Kanagawa, both of Japan

[73] Assignee: NS Tekuno Co., Ltd., Japan

[21] Appl. No.: 693,916

[22] Filed: Aug. 5, 1996

[30] Foreign Application Priority Data

| Aug. 7, 1995 | [JP] | Japan | 7-222546 |
| Jan. 12, 1996 | [JP] | Japan | 8-021883 |
| Feb. 26, 1996 | [JP] | Japan | 8-065460 |

[51] Int. Cl.$^6$ .............................. B23K 3/06; H05K 3/34
[52] U.S. Cl. ........................................... 228/37; 228/260
[58] Field of Search .................. 228/37, 260, 56.1, 228/180.1, 1; 118/410, 429

[56] References Cited

U.S. PATENT DOCUMENTS

| 3,119,363 | 1/1964 | Rieben | 228/37 |
| 3,989,180 | 11/1976 | Tardoskegyi | 228/37 |
| 4,465,014 | 8/1984 | Bajka et al. | 228/37 |
| 4,465,219 | 8/1984 | Kondo | 228/37 |
| 4,568,012 | 2/1986 | Kakuhata et al. | 228/37 |
| 4,773,583 | 9/1988 | Ishii et al. | 228/37 |
| 5,379,931 | 1/1995 | Ban Schaik | 228/37 |

OTHER PUBLICATIONS

*Soldering in Electronics,* by R.J. Klein Wassink, pp. 328–361, published in 1984, *Electrochemical Publications Limited.*

*Primary Examiner*—Samuel M. Heinrich
*Attorney, Agent, or Firm*—Thompson Hine & Flory LLP

[57] ABSTRACT

A wave soldering machine welling up molten solder by means of a pump for soldering a printed circuit board. The wave soldering machine comprises a nozzle formed of an enclosure surrounded by a front upright, a rear upright and side plates, a rear baffle plate extended from the top edge of the rear upright in a manner that the height of the rear baffle plate is adjusted, and a generally L-shaped front baffle plate having a large radius of curvature pivotally attached to the top edge of the front upright, whereby a solder wave formed on the top end of the rear baffle plate by surface tension of molten solder flows along the top surface of the front baffle plate. The rear baffle plate is particularly shaped and a bypass is formed to present a stable solder wave.

6 Claims, 7 Drawing Sheets

WAVE SOLDERING MACHINE

BACKGROUND OF THE PRIOR ART

1. Field of the Invention

The present invention relates to a wave soldering for soldering a printed circuit board of electric circuit, and more specifically, to the nozzle structure of the wave soldering machine for preventing solder bridges or other solder defects.

2. Description of the Related Art

Known as conventional automated soldering processes of printed circuit boards is a dipping soldering process in which a printed circuit board is dipped in a molten solder bath. Another known process is a wave soldering process, in which molten solder is pumped out through a nozzle to form a wave, and a printed circuit board is kept in contact with the wave of solder while it is advanced. In the wave soldering process, molten solder is circulated from the bottom side of the bath by a pump and spouted at the nozzle forming the wave. The wave soldering is thus free from a problem associated with the prior art that dross floating on the surface of the molten solder is in contact with the printed circuit board. However, oxide film existing on the surface of the solder wave sticks on the solder side of the printed circuit board, becoming a likely cause for dirt and solder bridge. In particular, when the transport speed of the printed circuit board is set to be higher, such a possibility becomes high. To achieve high yields, however, a fast transport speed is a requirement in production. Namely, mutually contradictory objectives, one for assuring the quality of automated soldering and the other for increasing the production yield, should be solved. To achieve these objectives, the solder wave section is conventionally put under the atmosphere of an inert gas such as nitrogen to prevent the generation of oxide film resting on the surface of the solder wave. This arrangement, however, makes the mechanism of the soldering machine complicated, not only increasing the cost of soldering but also increasing the running cost required for keeping the gas atmosphere.

To prevent non-wetting, most of the automated wave soldering processes are conventionally a double-wave process in which a primary nozzle for generating a turbulent flow wave and a secondary nozzle for finishing are employed. Even if a printed circuit board that has undergone these two stages of process needs a further process in which more solder is added manually or by a soldering robot after mass soldering, particularly to solder joints of a particular portion of large capacity electronic components or connectors, which need more solder. This lowers production efficiency.

SUMMARY OF THE INVENTION

It is an object of the present invention to provide a wave soldering machine which needs no duplication of soldering process that has been involved in the prior art wave soldering system, and which performs highly reliable mass soldering free from non-bridging and with a large adhesion quantity of solder allowed. The arrangement of the present invention may be used as a secondary nozzle, and even if it is used in a single process, the present invention offers an excellent soldering performance.

Disclosed further is a technique that allows mass soldering to be performed at a fast speed.

To achieve the above objects, the present invention offers improvements of, in particular, the nozzle of a soldering machine of a type which is positioned in the middle of the transport path of the printed circuit board and which spouts a solder wave upward by means of a pump. Namely, a wave former section is surrounded by a front upright, a rear upright and side plates. A rear baffle plate is extended from the top edge of the rear upright in a manner that the level of the rear baffle plate is adjusted. A generally L-shaped front baffle plate having a large radius of curvature is pivotally attached to the top edge of the front upright. The solder wave formed on the top end of the rear baffle plate by surface tension of molten solder is allowed to flow along the top surface of the front baffle plate. In this way, molten solder flowing upward forms the solder wave by surface tension above the level of the rear baffle plate, and then guided by the front baffle plate so that the solder flows forwardly. This makes a solder path, and backward overflow of solder is thus prevented. When the printed circuit board is removed from molten solder, solder detachment is assuredly performed with big solder fillets and then solder bridges or the like substantially reduced because the forward flow of solder is stable.

The rear baffle plate is mounted to the front side of the rear upright. The rear baffle plate has on its top end a flat support portion, and a curvature portion in front for forming a wave. A gap is allowed between the rear baffle plate and the rear upright so that a small flow of molten solder passes through the gap. The gap works as a passage for a bypass flow. In this arrangement, a smooth wave is formed by the rear baffle plate and the small flow of molten solder passes through the gap; thus, the rear baffle plate is kept at a proper temperature.

In another arrangement, the present invention takes positively advantage of an overflow that flows rearwardly over the rear upright and then drops down. Specifically, the top rear edge of the rear baffle plate is angularly cut, and a gap or bypass is formed between the rear baffle plate and the rear upright so that a small flow of molten solder passes through the gap. Part of the molten solder wave formed along the rear baffle plate flows backward over the top end of the rear baffle plate and joins the molten solder that flows up the gap or bypass, making an overflow rearward. Since, in this arrangement, a small rate of overflow is allowed to flow over the top of the rear baffle plate rearwardly, oxide film floating on the surface of molten solder wave is drawn in rearwardly. By cutting the rear corner of the rear baffle plate, a smooth overflow is formed. When the printed circuit board is in contact with molten solder wave, the oxide film on the wave surface pushed by the printed circuit board is rapidly drawn in by the bypass flow. Thus, even if the transport speed of the printed circuit board is increased, sticking of oxide film to the printed circuit board is prevented. Since the flow rate of molten solder flowing rearwardly is very small relative to the molten solder that forms the solder wave, solder that once sticks onto the printed circuit board is not drawn by the overflowing solder. This permits a large fillet solder joint.

The rear top corner of the rear baffle plate is cut to form an angularly cut portion or round cut portion, and depending on the shape of the cut and the height of the top end of the rear baffle plate, the rate of overflow is determined. By forming the cut portion, a small rate of overflow is permitted in an assured manner.

In another arrangement, an overflow baffle plate is mounted to the rear side of the rear upright with the rear upright sandwiched between the rear baffle plate and the overflow baffle plate. The difference between the levels of the top ends of the rear baffle plate and the overflow baffle plate are kept within a fixed range. Both plates are adjustably supported by the rear upright. This arrangement serves the purpose of generating the overflow in a stable and assured manner. Specifically, to cause a bypass flow to draw in the overflow rearwardly, the difference between the levels of the top ends of the overflow baffle plate and the rear baffle plate is important. If the difference is too large, no draw-in action takes place. If the difference is too small, a stagnant flow takes place on the confluence zone where the bypass flow and the overflow meet. Thus, are liable overflow rearward cannot be achieved. To this end, the difference is appropriately set to adjust flow rate of molten solder and to achieve a reliable overflow.

These and other advantages and features of the present invention will be more fully understood from the following description of the invention.

DESCRIPTION OF THE PREFERRED EMBODIMENTS

Figure 1:
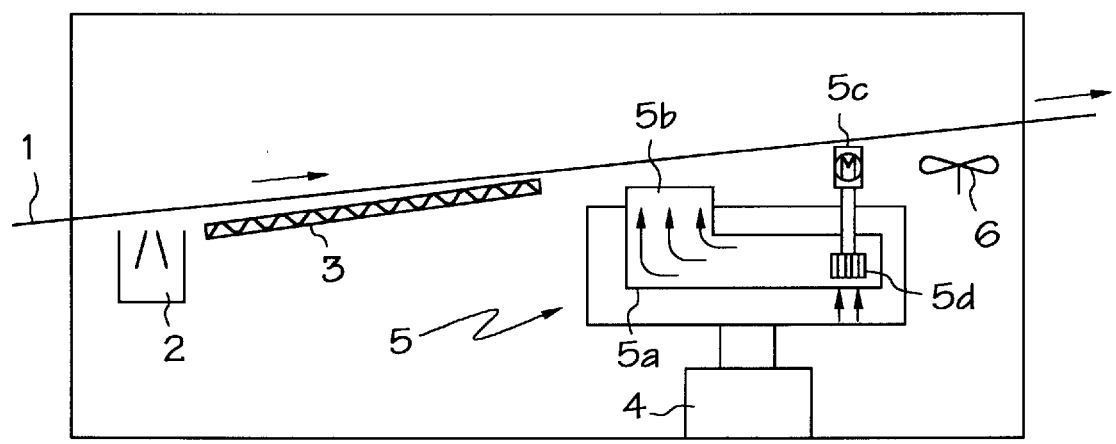
FIG. 1 generally shows a wave soldering machine.

FIG. 1 is the general view of the wave soldering machine. Shown herein are a transport path 1 along which printed circuit boards having components mounted thereon are transported, a fluxer unit 2 for applying flux on the solder side of the printed circuit board, a preheater unit 3 for preheating the printed circuit board for achieving good soldering, and a base 4 for a molten solder bath. A molten solder bath 5 has internally a solder flow duct 5a immersed in molten solder, and a nozzle 5b is connected to the flow duct 5a. Designated 5c is a pump motor which agitates molten solder with vanes 5d to form a solder flow, and spouts the solder flow through the nozzle 5b to solder the printed circuit board. Designated 6 is a cooling fan for cooling the printed circuit board.

Figure 2:
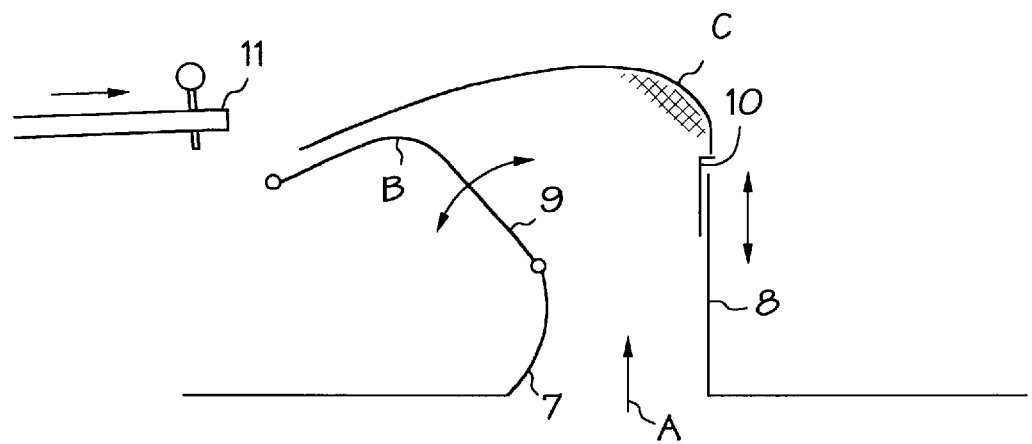
FIG. 2 generally shows a wave former section including a nozzle according to the present invention.

FIG. 2 roughly shows a first embodiment of the wave former section including the nozzle 5b. Shown herein are a front upright 7 of the nozzle 5b and a rear upright 8 of the nozzle 5b, and molten solder is allowed to flow between the front upright 7 and the rear upright 8. Designated 9 is a front baffle plate that is connected to the top end of the front upright 7 in a manner that the front baffle plate 9 is pivoted within a permissible range. Designated 10 is a rear baffle plate that is extended from the top end of the rear upright 8 in a manner that the rear baffle plate 10 is adjusted in its level. Designated 11 is a printed circuit board transported along the transport path. The front baffle plate 9 has an L-shaped configuration with a large radius of curvature. When molten solder flows in the direction of A, it advances smoothly along the radius of curvature B, and simultaneously it forms a smooth wave C at the top edge of the rear baffle plate 10 because of surface tension of molten solder. Since the front baffle plate 9 has a pivotal mechanism, the angle of pivot varies within the permissible range in response to flow rate of molten solder. This arrangement prevents molten solder from overflowing rearwardly. By changing the height of the rear baffle plate 10, the top level of the wave C varies. Even if the printed circuit board 11 type is changed or lead protrusion length of the components on the printed circuit board 11 are varied, such changes are accommodated by adjusting the height of the rear baffle plate 10.

Figure 3:
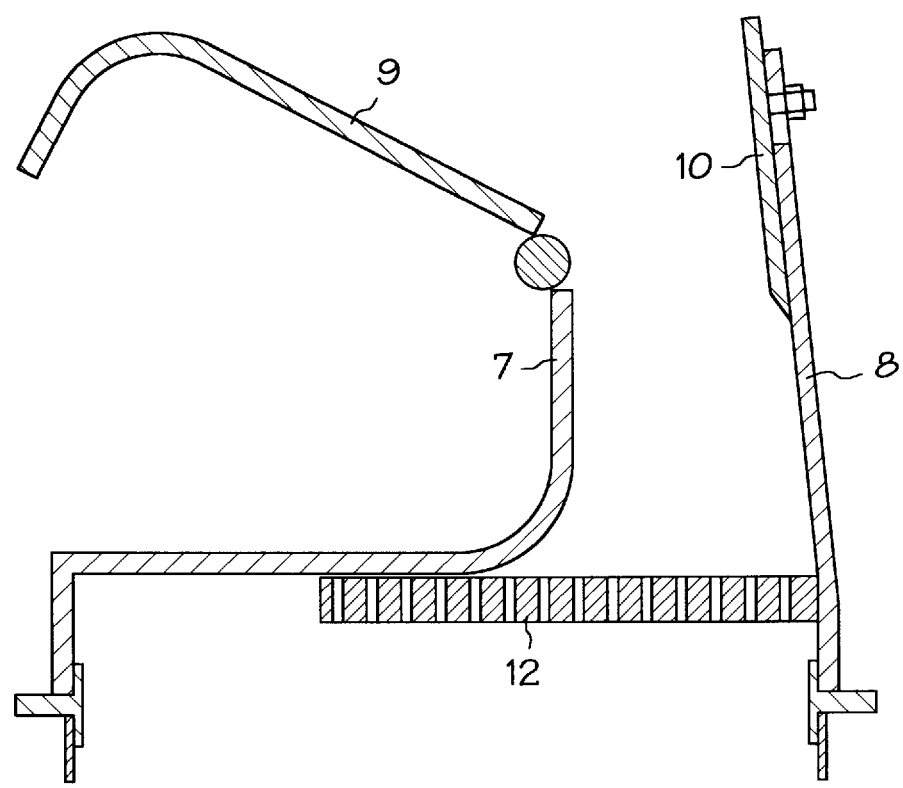
FIG. 3 shows an example of the nozzle section.
Figure 4:
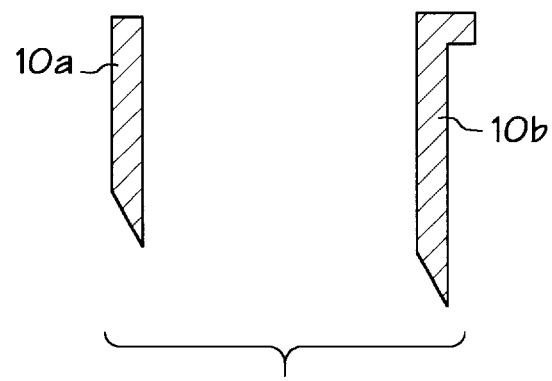
FIG. 4 is a cross-sectional view showing two examples of the rear baffle plate.

FIG. 3 shows the detail of the nozzle 5b of FIG. 2. A grid plate 12 has numerous through-holes for straightening the flow of molten solder welled up by the pump. The front upright 7 is not straight upright at its bottom portion, but curved backward upwardly in a curvature portion 7a and then extends upright, in order to prevent pulsation of the solder flow. The rear upright 8 is slightly inclined forwardly to smooth the flow of solder. This prevents assuredly the overflow of solder that can take place when the rear upright is upright or inclined rearwardly. The rear upright 8 can be adjusted in its height by means of its slide adjustment portion of elongated holes and screws. This adjustment portion adjusts the height of the wave C in a manner that it meets the removal point where the printed circuit board 11 that comes from the front into contact molten solder wave gets out of contact with molten solder wave so that a highly reliable soldering results with a sufficient quantity of solder fillet accumulated. Two types of rear baffle plates, a linear 10a and an L-shaped 10b, are prepared for choice to adjust the height and size of the wave C more finely. In particular, the rear baffle plate 10b offers a large top support surface, which prevents dropping of solder at the rear side when the printed circuit board is removed from the solder wave. This increases the solder quantity stuck further while preventing solder bridges due to sudden solder tearing off. Both the rear baffle plates 10a, 10b are mounted at the front side of the upright 8. Each of the rear baffle plates 10a, 10b is tapered toward its bottom end so that a turbulent flow of solder is prevented and that the solder wave C formed by surface tension is stabilized.

Figure 5:
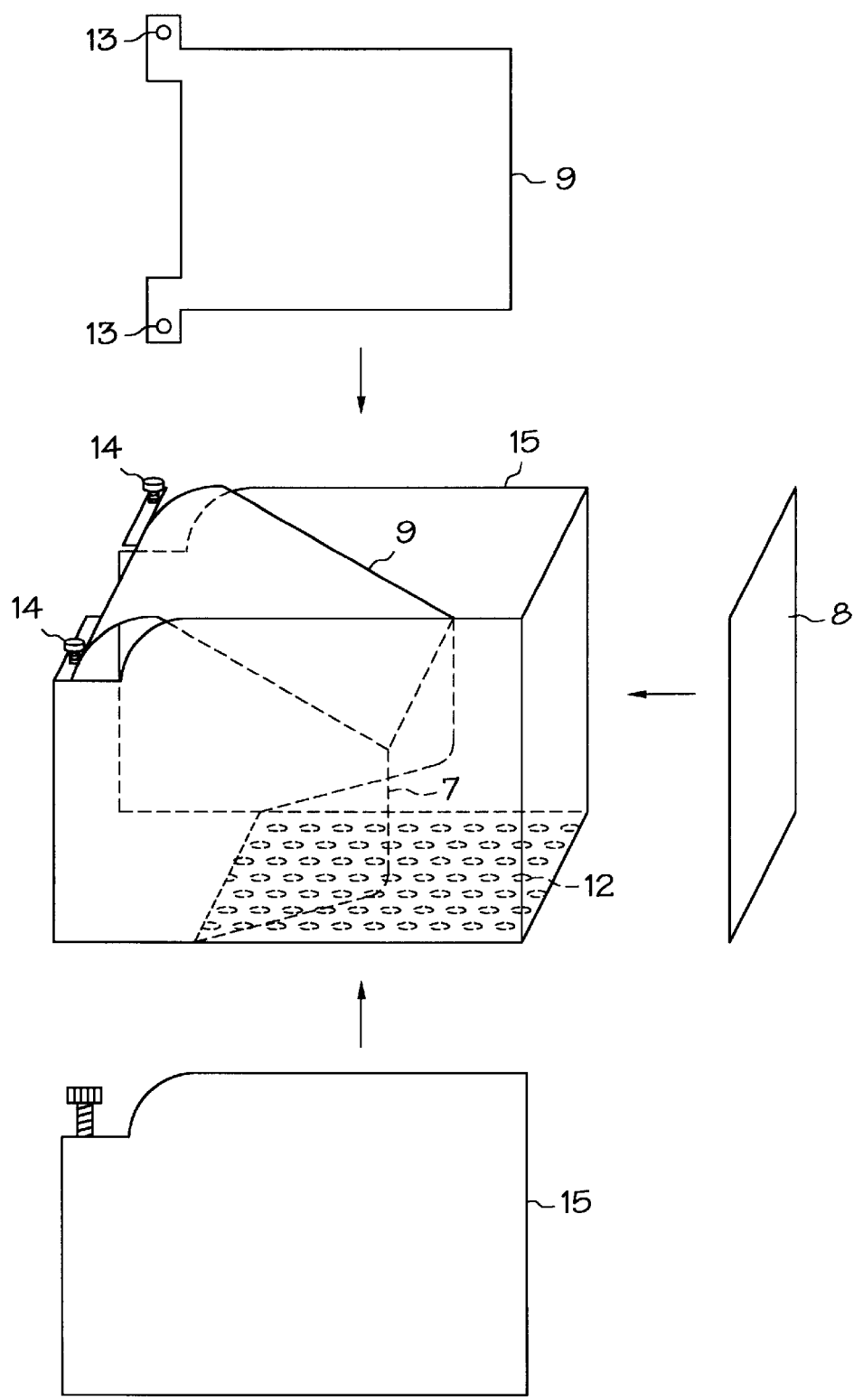
FIG. 5 is an exploded perspective view of the nozzle.

FIG. 5 is the exploded perspective view of the nozzle 5b, showing the pivotal mechanism of the front baffle plate 9. The front baffle plate 9 is formed by bending a flat plate and is provided with holes 13 at both front ends. Designated 14 are height adjustment screws that are inserted through the holes 13 and screwed into threaded holes of screw seats. By tightening or loosening the screws 14, the clearance between the screw heads and their seats are adjusted, and thus the range of pivot of the front baffle plate 9 is adjusted. Designated 15 are side plates. Adjusting the range of pivot assures an appropriate soldering time for the printed circuit board. The angle of molten solder wave surface is determined by the solder flow from the wave C formed by the rear baffle plate 10 along the top surface of the front baffle plate 9, and this angle is adjusted to be equal to the angle of transport of the printed circuit board as much as possible. In this embodiment, the wave C has to be formed by surface tension, and the appropriate angle of transport of the printed circuit board ranges from horizontal to 3 degrees. The angle of molten solder wave surface is also adjusted to be within this range. Depending on the type of soldering machine, however, the angle of transport varies from horizontal to 6 degrees. To follow this range, the front baffle plate 9 is pivoted. When it is pivoted, the angle of molten solder wave surface varies, and the soldering time is thus adjusted.

Figure 6:
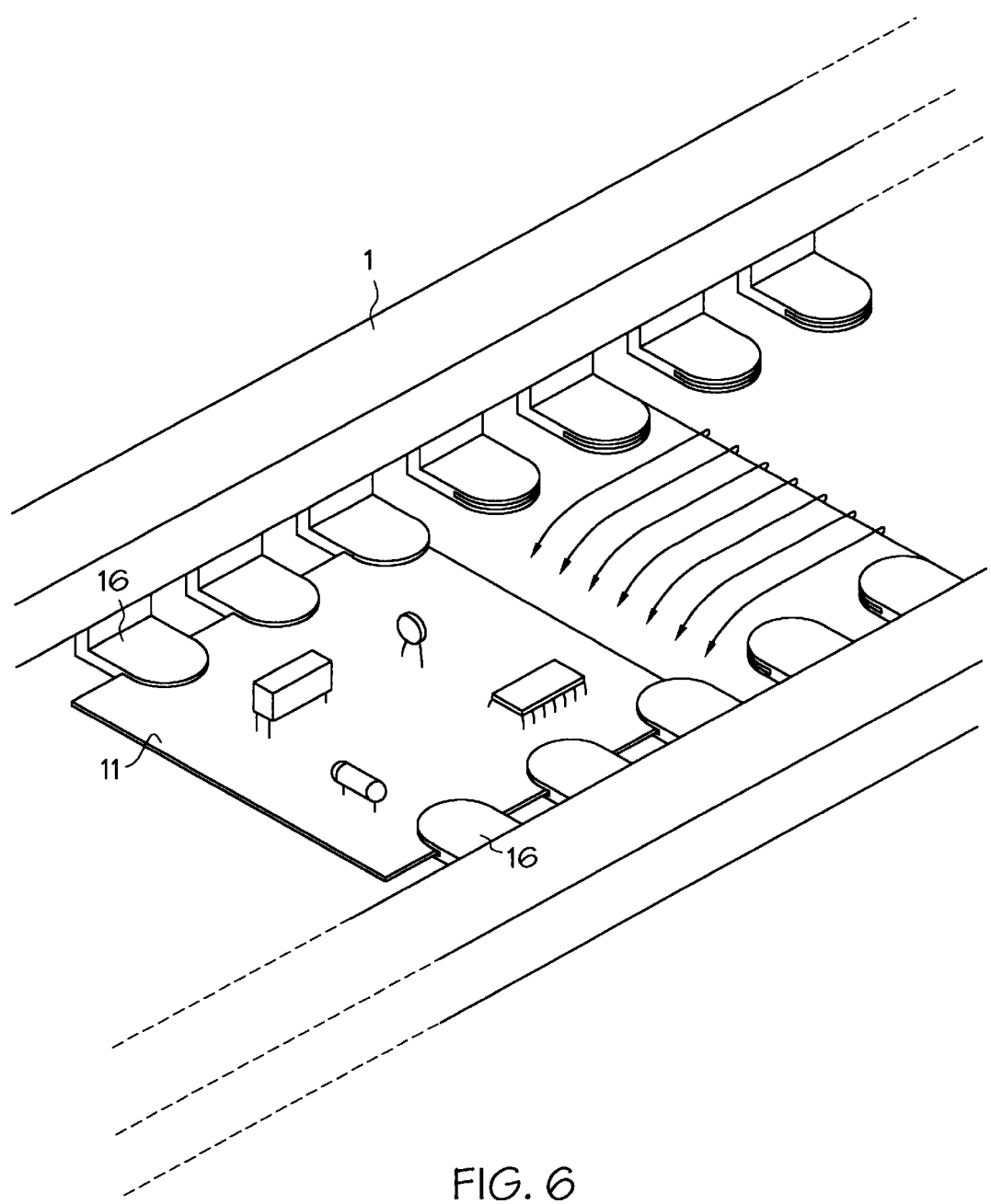
FIG. 6 is a perspective view showing the relationship of the surface of molten solder with the printed circuit board.

FIG. 6 is the perspective view showing the relationship of the transport path 1, printed circuit board 11 and the surface of molten solder. Designated 16 herein are carrier fingers that run along the transport path 1 to grip and advance the printed circuit board 11.

Figure 7:
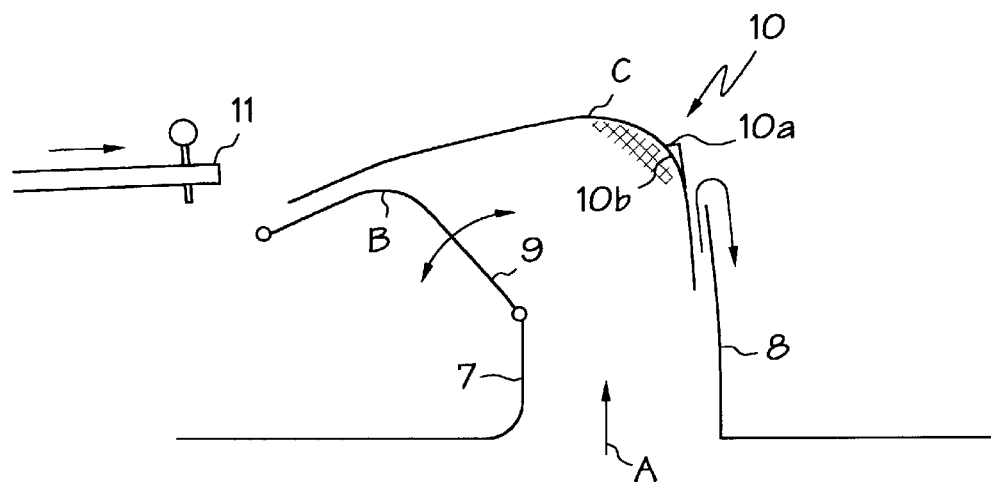
FIG. 7 generally shows the wave former section including the nozzle of a second embodiment of the present invention.

FIG. 7 shows a second embodiment of the wave former section including the nozzle 5*b*. In FIG. 7, components equivalent to those with reference to FIG. 2 are designated with the same reference numerals. The rear upright 8 and the rear baffle plate 10 are different from those in FIG. 2. Specifically, the rear baffle plate 10 has a wide-area top support portion 10*a* and a curvature portion 10*b* in front. The rear baffle plate 10 is mounted to the rear upright 8 with a gap therebetween, so that a small flow of solder passes through the gap. The front baffle plate 9 has an L-shaped configuration with a large radius of curvature at its bend. Molten solder is welled up in the direction of A, and moves along the curvature B smoothly, while molten solder at the top end of the rear baffle plate 10 forms the wave C by means of surface tension. A small flow of solder passes through the gap between the rear upright 8 and the rear baffle plate 10, breaks away from the rear baffle plate 10 and overflows. This keeps the support portion 10*a* constantly heated, thereby keeping an appropriate soldering temperature. The curvature portion 10*b* enhances fluidity of the wave C. By changing the height of the rear baffle plate 10, the top level of the wave C varies. Even if the printed circuit board 11 type is changed or lead protrusion length of the components on the printed circuit board 11 are varied, such changes are accommodated by adjusting the height of the rear baffle plate 10.

Figure 8:
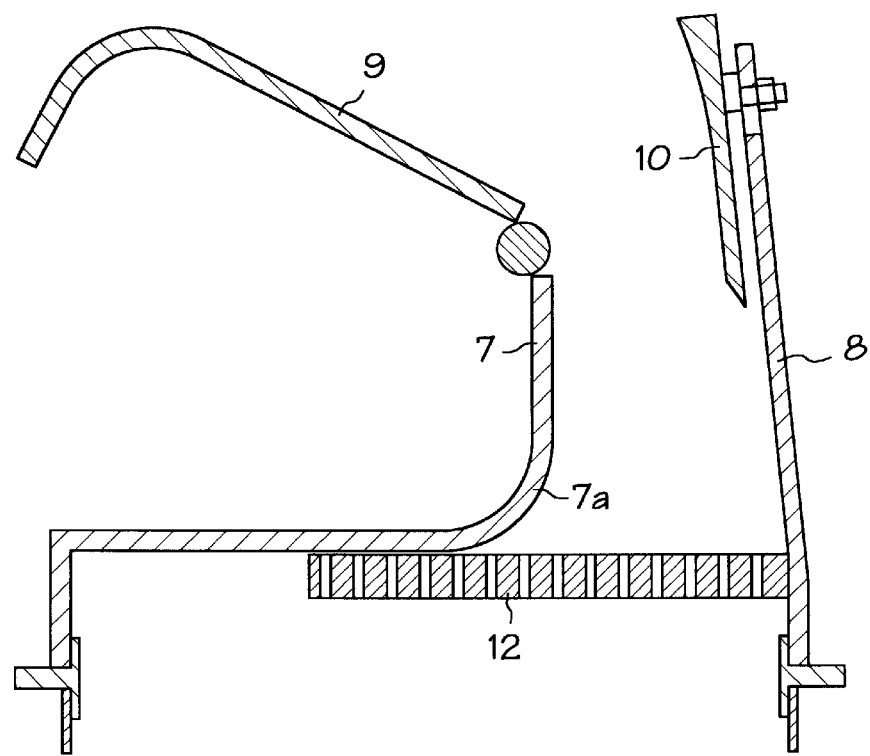
FIG. 8 shows an example of the nozzle of the second embodiment.

FIG. 8 shows the detail of the nozzle 5*b* of the second embodiment in the same way as in FIG. 3. The front upright 7 is not straight upright at its bottom portion, but curved backward upwardly in a curvature portion 7*a* and then extends upright, in order to prevent pulsation of the solder flow.

Figure 9A:
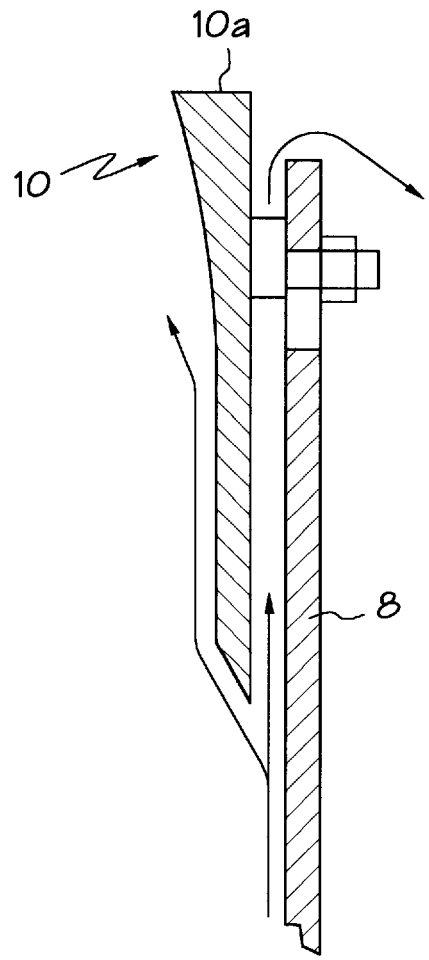
FIG. 9 is a cross-sectional view showing the mounting example of the rear baffle plate.
Figure 9B:
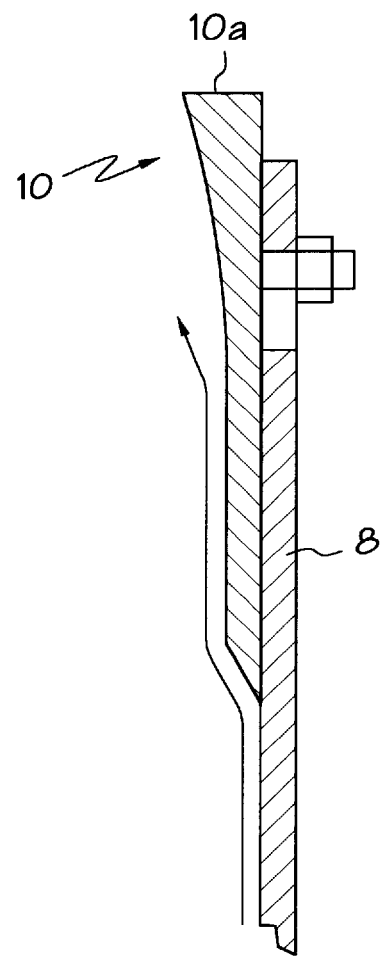

FIGS. 9*a* and 9*b* show the rear baffle plate 10 mounted to the rear upright 8 according to the second embodiment. In FIG. 9*a*, the gap is provided between the rear baffle plate 10 and the rear upright 8, and in FIG. 9*b*, both are attached with no gap therebetween. The difference between both figures is the presence or absence of the gap. It is learned that the arrangement in FIG. 9*a* prevents residual solder on the support portion 10*a*. This is because the top support portion 10*a* is kept heated when solder passes through the gap that functions as a bypass and overflows rearwardly, and molten solder is kept at a preferable condition. Therefore, when printed circuit boards are consecutively introduced into the machine, the wave C is formed by stable surface tension. Although the arrangement in FIG. 9*b* is outperformed by that in FIG. 9*a* in the ability to keep temperature, the curvature portion 10*b* forms a smooth wave C. Thus, molten solder is prevented from dropping rearwardly when the printed circuit board is removed from the solder wave, and the solder quantity stuck to the printed circuit board is increased compared with the prior art. Solder bridges due to sudden solder tearing off are prevented. Thus, an excellent soldering performance is achieved compared to the prior art. In FIG. 9*a*, any appropriate structure may be employed to keep the gap. For example, spacers may be employed. In this case, screws that secure the baffle and the upright should have a sufficient length to cover the gap. Considering processability and durability, the material for the rear baffle plate 10 is preferably stainless steel. It is also contemplated that titanium for the rear baffle plate 10 is employed to improve return of the molten solder or that the top support portion 10*a* is Teflon-coated to present smoothness to avoid solder residue.

Figure 10:
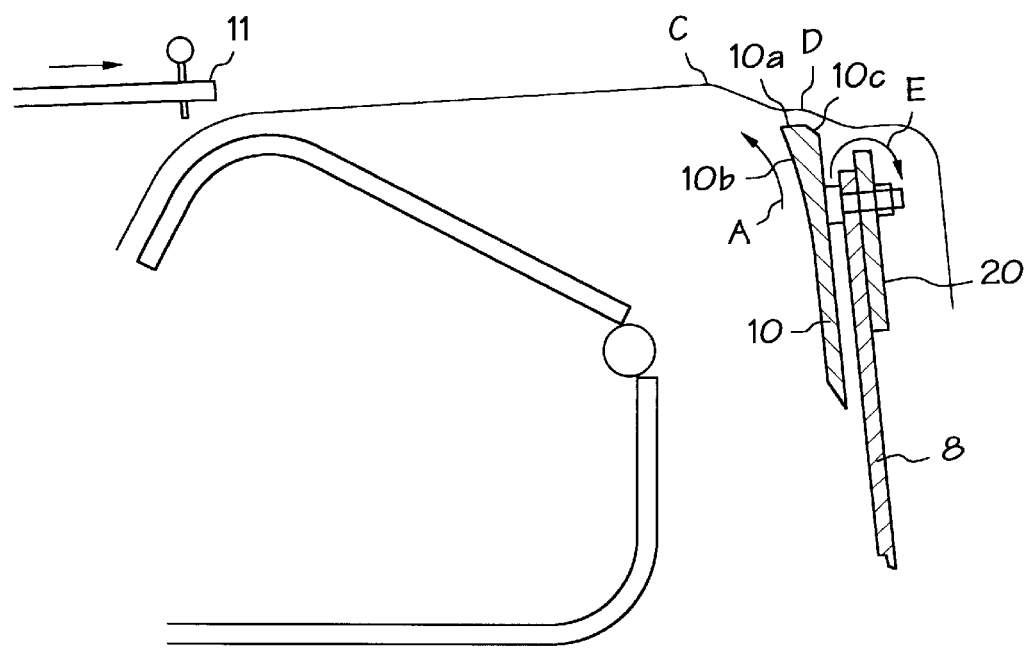
FIG. 10 shows the wave former section including the nozzle according to a third embodiment of the present invention.
Figure 11:
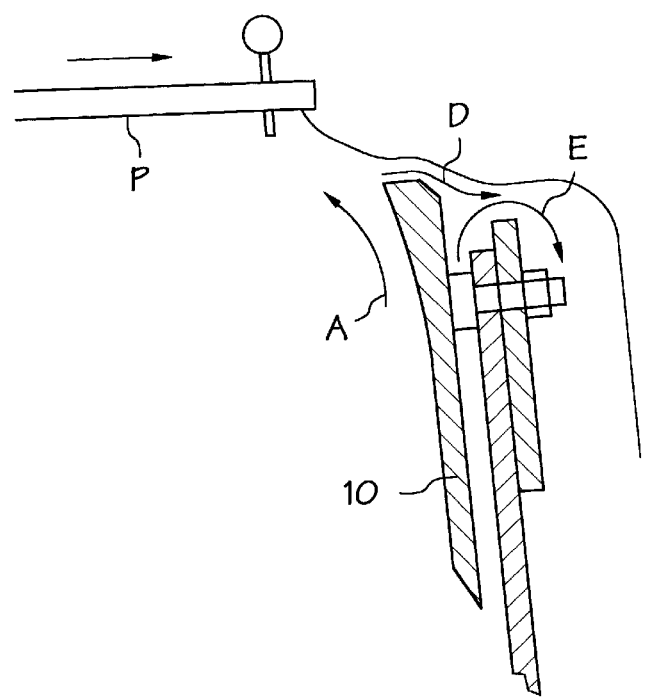
FIG. 11 is a cross-sectional view showing an example of the rear portion of the nozzle of the third embodiment.

FIG. 10 shows a third embodiment of the wave former section including the nozzle 5*b*. FIG. 11 shows the detail of the rear section of the nozzle. Components equivalent to those with reference to the first embodiment are designated with the same reference numerals. The third embodiment is different from the first and second embodiments in the relationship of the rear upright 8 with the rear baffle plate 10. The rear baffle plate 10 is extended from the rear upright 8 in an adjustable manner, and has a wide-area top support portion 10*a*, a curvature portion 10*b* in front, and a rear cut portion 10*c*. The rear baffle plate 10 is mounted to the rear upright 8 with a gap therebetween, and a small flow of solder passes through the gap. Designated 20 is an overflow baffle plate, which adjusts the height of the top level of molten solder passing the bypass and falling down rearwardly. In this embodiment, a gap is allowed between the rear baffle plate 10 and the overflow baffle plate 20 secured to each other. The overflow baffle plate 20, the rear upright 8 and the rear baffle plate 10 are secured together with screws. Alternatively, the overflow baffle plate 20 may be secured to the rear upright 8, and then the rear baffle plate 10 is secured to the rear upright 8. Any appropriate structure may be employed to keep the gap. For example, spacers may be employed. In this case, screws that secure the baffle and the upright should have a sufficient length to cover the gap. The heights of the top ends of the rear baffle plate 10 and overflow baffle plate 20 have to be separately adjusted. The front baffle plate 9 has an L-shaped configuration with a large radius of curvature at its bend. Molten solder is welled up in the direction of A, then moves along the curvature B. On the curvature portion 10*b* of the rear baffle plate 10, molten solder forms a smooth wave C, and an overflow D of molten solder takes place. Specifically, a small flow of molten solder flows up through the gap between the rear upright 8 and the rear baffle plate 10, making a bypass flow that flows over the rear upright 8, and overflow baffle plate 20 as shown by the arrow E. The flow shown by the arrow E draws in the overflow D, and both flows join. As a result, the flow speed of the overflow D increases, draws in rearwardly oxide film on the surface of molten solder. The curvature portion 10*b* help enhance fluidity of the wave C. Since the front baffle plate 9 has a pivotal mechanism, the angle of pivot varies within the permissible range in response to flow rate of molten solder. This arrangement allows the speed and flow rate of the overflow of molten solder over the rear baffle plate 10 to be adjusted. By changing the height of the rear baffle plate 10, the top level of the flow of molten solder (wave C) varies. Even if the printed circuit board 11 type is changed or lead protrusion dimensions of the components on the printed circuit board 11 are varied, such changes are accommodated by adjusting the height of the rear baffle plate 10.

In this embodiment, the level difference between the top end of the rear baffle plate 10 and the top end of the overflow baffle plate 20 is set to be adjusted within a range of ±5 mm+10 mm. This range serves satisfactorily the adjustment purpose. In excess of this range, no proper overflow is achieved. The above figures of the range is subject to a slight modification depending on the overall size of the nozzle.

What is claimed is:

1. A wave soldering machine positioned in the middle of the transport path of a printed circuit board and welling up a solder wave upward by means of a pump, comprising:

a nozzle formed of a front upright, a rear upright and side plates, a rear baffle plate extended from the top edge of the rear upright in a manner that the height of the rear baffle plate is adjusted, and a generally L-shaped front baffle plate having a large radius of curvature pivotally attached to the top edge of the front upright, whereby a solder wave formed on the top end of the rear baffle plate by surface tension of molten solder flows along the top surface of the front baffle plate, wherein the rear baffle plate is mounted to the side of the rear upright facing the front baffle plate and the rear baffle plate has a flat top support portion, and a curvature front portion for forming the solder wave.

2. The wave soldering machine according to claim 1, wherein a gap is formed between the rear baffle plate and the rear upright so that a small flow of molten solder passes through the gap.

3. A wave soldering machine positioned in the middle of the transport path of a printed circuit board and welling up a solder wave upward by means of a pump, comprising:

a nozzle formed of a front upright, a rear upright and side plates, a rear baffle plate extended from the top edge of the rear upright in a manner that the height of the rear baffle plate is adjusted, and a generally L-shaped front baffle plate having a large radius of curvature pivotally attached to the top edge of the front upright, whereby a solder wave formed on the top end of the rear baffle plate by surface tension of molten solder flows along the top surface of the front baffle plate, wherein the top rear edge of the rear baffle plate is cut to form a cut surface and a bypass is formed between the rear baffle plate and the rear right upright so that a small flow of molten solder passes through the bypass, whereby part of the molten solder wave formed along the rear baffle plate flows backward over the top end of the rear baffle plate and joins the molten solder that flows up the bypass, and the joined molten solder flows over rearwardly.

4. The wave soldering machine according to claim 3, wherein said cut surface of the rear baffle plate is flat.

5. The wave soldering machine according to claim 3, wherein said cut surface of the rear baffle plate is curved.

6. The wave soldering machine according to claim 3, wherein an overflow baffle plate is mounted to the rear side of the rear upright with the rear upright sandwiched between the rear baffle plate and the overflow baffle plate, a member that beforehand secures the two baffle plates in a fixed height difference between the levels of the top ends of the rear baffle plate and the overflow baffle plate is adjustably supported by the rear upright.

* * * * *